Aug. 2, 1966  D. H. REED ET AL  3,264,475
METHOD FOR CALIBRATING A RADIOACTIVE LOGGING SYSTEM
Filed Dec. 31, 1962  9 Sheets-Sheet 1

Fig. 1a

INVENTORS
Dale H. Reed
Henry F. Dunlap
Thomas S. Hutchinson
Robert E. McCallum
William C. Pritchett
BY
Charles F. Steininger
Attorney

INVENTORS
Dale H. Reed
Henry F. Dunlap
Thomas S. Hutchinson
Robert E. McCallum
William C. Pritchett
BY
Charles F. Steininger
Attorney

INVENTORS
Dale H. Reed
Henry F. Dunlap
Thomas S. Hutchinson
Robert E. McCallum
William C. Pritchett BY
Charles F. Steininger
Attorney

INVENTORS
Dale H. Reed
Henry F. Dunlap
Thomas S. Hutchinson
Robert E. McCallum
William C. Pritchett BY
Charles F. Steininger
Attorney

Fig. 5b

Aug. 2, 1966  D. H. REED ET AL  3,264,475
METHOD FOR CALIBRATING A RADIOACTIVE LOGGING SYSTEM
Filed Dec. 31, 1962  9 Sheets-Sheet 9

*INVENTORS*
Dale H. Reed
Henry F. Dunlap
Thomas S. Hutchinson
Robert E. McCallum
William C. Pritchett
BY *Charles F. Steininger*
Attorney 3,264,475
METHOD FOR CALIBRATING A RADIOACTIVE
LOGGING SYSTEM
Dale H. Reed, Henry F. Dunlap, Thomas S. Hutchinson, Robert E. McCallum, and William C. Pritchett, Dallas, Tex., assignors to The Atlantic Refining Company, Philadelphia, Pa., a corporation of Pennsylvania
Filed Dec. 31, 1962, Ser. No. 248,333
6 Claims. (Cl. 250—71.5)

The present invention relates to an improved chlorine logging system. Specifically, the invention relates to a method for calibrating a chlorine logging system.

This application is a continuation-in-part application of copending application 183,960 filed Mar. 30, 1962 and entitled Improved Chlorine Logging System, now abandoned.

Basically, the chlorine log is produced by bombarding a subsurface formation with fast neutrons and measuring the formation's response in terms of prompt gamma rays of capture in a given energy range. Formation fluids, well bore fluids and certain elements in the formation moderate the fast neutrons until they reach thermal energy. At this energy, the neutrons are subject to capture by various atoms making up the formation. As a result of such captures, gamma rays are emitted and their energies are characteristic of formation elements performing the captures. Therefore, since chlorine is a principal capturer because of its large thermal neutron capture cross section, the formation's chlorine content can be determined by logging the count rate of gamma rays with energies characteristic of chlorine. This chlorine content, together with a conventional hydrogen content (neutron) curve, recorded separately or simultaneously, are conventionally referred to as a chlorine log. Since the hydrogen content or neutron curve is diagnostic of formation porosity and the chlorine curve is diagnostic of chlorine content, the log can be used to determine if porous formations contain salt water. That is, if the neutron curve registers a porous formation and the chlorine curve registers a small gamma ray count in the energy range most affected by chlorine, then the formation apparently contains hydrogen (water or oil) but little salt. If the depth of the formation rules out the presence of fresh water, oil is indicated.

Although chlorine logging is not restricted in its operation, it is particularly well suited to locating new producing formations during workover operations or in wells located in depleted reservoirs. In most instances, reservoirs nearing depletion are located in old producing areas where original unsophisticated well logs and other data are inadequate or have been lost or destroyed. Prior to the advent of the chlorine log, the wells in such areas were usually shut-in and abandoned since the producing casing prevented the use of electrical or sonic logs to aid in locating valuable new producing formations.

Although the chlorine log shows great potential in locating new producing formations in cased boreholes, many serious problems still confront the present state of the art. Some of these problems include:

(1) The over-all log is by nature limited to shallow depths of investigation and therefore borehole effects seriously interfere with count rate. Some of the more serious borehole conditions include iron casing and casing centralizers, borehole fluid, non-uniform cement jobs, variation of borehole size with change in depth, variation of drilling fluid depth of invasion, variation in position of sonde with formation logged which in turn is dependent on variation of position of casing within a borehole.

(2) The log is continually faced with changes in the chemical composition of formations. This can be one of the most serious problems and frequently produces curves misleading or ambiguous in nature. As an example, shale or shaly streaks in sand can falsely indicate salt water as an oil zone. In formations where limestone grades into dolomite or where cement behind casing is not uniform a log response is obtained which can erroneously be interpreted as oil.

(3) Gas-bearing formations may often be difficult to diffierentiate from tight salt water sands.

(4) The source and detectors utilized by the log introduce statistical variations.

(5) Gamma ray emission peaks from silicon in sand, aluminum in shale, calcium in limestones and dolomite, iron in well casing, calcium in cement jobs, give emission peaks in the same energy ranges as chlorine.

To fully appreciate the varying effects these problems can have on locating petroliferous deposits with a chlorine log it is necessary to understand how subsurface geological formations can vary throughout different parts of the country. As an example, "soft-rock" country such as the lower gulf coast and "hard-rock" country such as west Texas are areas containing oil-producing formations and other subsurface formations that differ greatly in their chemical and physical characteristics.

The lower gulf coast contains a weathered layer of heavy soils and a relatively shallow water table. The subsurface formations are generally a series of soft shales with poorly consolidated sandstones.

The west Texas area contains a weathered layer in which caliche is common and the water table is relatively deep. The subsurface formations are a series of shales, limestone, dolomite and evaporites with indurated sandstone. These rocks are older, denser and harder than the equivalent types of rocks in the lower gulf coast and therefore are, as a rule, less porous.

In the limestone reservoirs and even in the indurated sandstone reservoirs in west Texas the difference between salt water and oil is less discernible than in the gulf coast area. This is due primarily to the decrease in porosity and the resulting decrease in chlorine in the west Texas reservoirs. In other words, in west Texas reservoirs the difference between salt and fresh water on the chlorine curve is evidenced by a smaller difference in relative count rate between the chlorine and hydrogen responses for a given salinity.

With the above differences in mind, let us now examine the enumerated problems faced by the chlorine logging operation and see how they vary from soft-rock areas to hard-rock areas.

(1) If formation fluid redistribution is allowed before logging operations are conducted, borehole conditions are approximately the same in both soft- and hard-rock country. The response of the tool to these conditions depends on formation conditions that vary in soft- and hard-rock areas.

(2) The problems caused by formations changing chemical compositions are generally aggravated in hard-rock country. That is, the response to chemical changes superimposed on the reduced response to salinity changes in hard-rock country aggravates the problem of detecting hydrocarbons. In the case of limestone grading into dolomite, the reduced calcium content in dolomite reduces the number of neutron captures by calcium. Since many of the calcium gamma rays are in the chlorine gamma range, dolomitization thus produces a false indication of an oil-bearing formation. The presence of shale in any type of structural formation produces a lower count rate giving a false count rate reading to a formation actually containing salt water. That is, the presence of hydrogen with little salt in the shale increases neutron moderation and therefore decreases the amount of gamma rays actually reaching the detector. The chlorine count is particularly decreased. In the less porous formations, the above-described smaller difference between salt water and oil further emphasizes the false indication produced by shale.

(3) The presence of gas in any type of producing formation often produces an indication deceptively close to an indication produced by the presence of salt water in tight or low porosity sand. That is, the greatly reduced hydrogen content in the gas (as compared to given volumes of water or oil) reduces neutron moderation thereby producing higher count rates on the hydrogen and on the chlorine curves. In a tight salt water zone the low hydrogen content can yield an identical high count rate on the hydrogen curve and a near identical count rate on the chlorine curve. Therefore, in limestone reservoirs of the hard-rock country, the anomalously high response due to calcium makes the detection of any difference between the two more difficult.

(4) Statistical errors introduced by variations in the source are more serious for the low count rates measured in high porosity formations and therefore more serious in soft-rock country than in hard-rock country.

(5) Interfering gamma ray emission peaks from elements other than chlorine increase as the logging operations are moved to hard-rock country. The difficulty stems mainly from the considerable overlap of the calcium spectrum and the chlorine spectrum, calcium being a more serious problem than the silicon in soft-rock country. Calcium is considerably more prevalent in west Texas than in the gulf coast. Sulfur, gypsum and magnesium are also troublesome and are more prevalent in west Texas.

The chlorine logging method has been practiced in various ways in an attempt to successfully distinguish between salt water and oil under varying conditions such as described above. However, to the best of applicants' knowledge, there is no tool or method presently available that can actually operate satisfactorily except under the most favorable borehole conditions, i.e., in shale-free sands of high porosity with high salinity formation waters.

Even under these favorable conditions the operation of the present-day tools does not always give strong indications of hydrocarbon-bearing formations.

The present state of the art offers conflicting evidence as to what portion of the prompt capture gamma ray energy spectrum is most informative for chlorine logging purposes. U.S. Patent Re. 24,383 discusses identifying chlorine content by recording gamma rays of capture with energies on the order of 8 or even 9 m.e.v. U.S. Patents 2,830,185 and 2,949,535 record gamma ray energies of capture in the neighborhood of 7 m.e.v. and then define the term "neighborhood" by stating a range of above about 3 m.e.v. and below 10 m.e.v. Various instrumentations have been used to practice chlorine logging in the energy ranges described; however, to the best of applicants' knowledge the combination of a single crystal detector with a downhole, two channel pulse height analyzer has not been used to overcome the disadvantages inherent in the prior art instrumentations. Additionally, heretofore, no calibration method has been available to establish a repeatable accurate environment for calibrating the various chlorine logging systems in the field.

Accordingly, an object of the present invention is to provide for an improved method and means for calibrating radioactive logging systems.

Another object of the present invention is to provide an improved calibrating method and a means that produces an accurate, repeatable calibrating environment and is simple to utilize in the field.

Other and further objects of the instant invention will be apparent from the following detailed description of the present invention.

The general arrangements and the other objects of the invention may be more readily determined by referring to the drawings wherein.

Briefly described, the invention contemplates a chlorine logging operation utilizing a novel calibration method.

Applicants have conducted extensive research and experimentation in an attempt to produce a chlorine logging method and apparatus that can operate successfully and dependably regardless of formation and borehole conditions. As a result of these activities, applicants have discovered the critical portion of the prompt capture gamma ray energy spectrum which is most sensitive to chlorine and is contrary to the prior art teachings. Use of this portion of the spectrum unexpectedly overcomes recognized chlorine logging problems as well as certain other problems which applicants have discovered as serious obstacles to the operation of the prior art. In order to substantiate that this portion of the spectrum is critical and achieves significant improvements under varying conditions, approximately 150 different experimental runs were made with reservoir and borehole conditions varying from typical to extreme. The porosity of the reservoir (sand) was varied from 18 to 35 percent, the size of the casing was varied from 5.5 to 7 inches, the weight of the 5.5 inch casing was varied from 14 to 20 pounds, the annulus material was varied from cement to mud, the position of the casing with respect to the borehole was varied from centralized to eccentric, and the fluid in the casing was varied from fresh water to salt water to air.

To better appreciate the significant improvements achieved by viewing the new portion of the spectrum, a typical range of sand reservoir and borehole conditions used in the substantiation runs and found in a typical gulf coast area is included for purposes of illustration. These reservoir conditions were logged with fresh water (3,100 p.p.m. NaCl) and with salt water (180,000 and 90,000 p.p.m. NaCl) as the reservoir fluid. For purposes of simplicity, the term salt water, unless otherwise qualified, denotes water with salt content of 180,000 p.p.m. In logging each model representing a given set of reservoir and borehole conditions, initial data was obtained by plotting the logarithm of counts per ten minutes in each .05 m.e.v. increment versus energy in million electron volts.

Figure 1A:
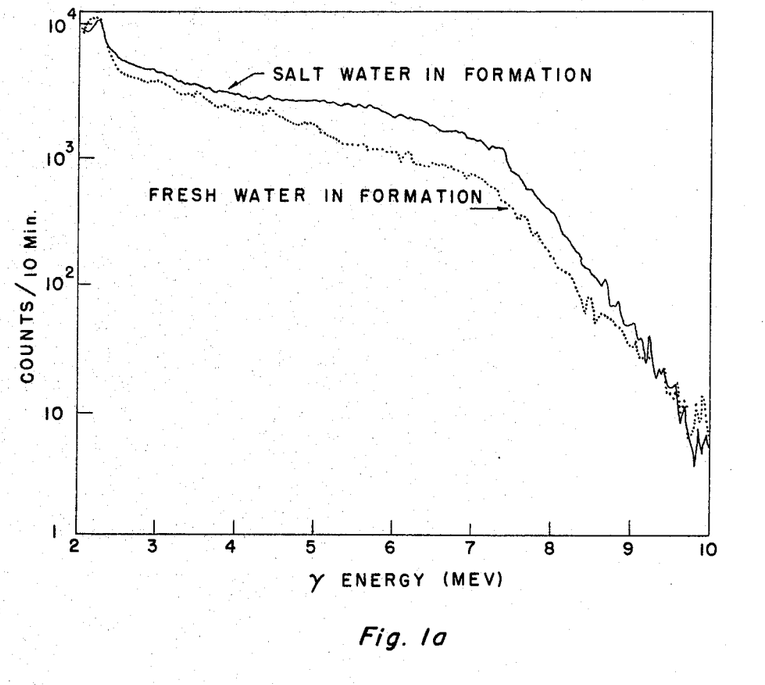
FIGURE 1a shows prompt capture gamma ray energy response curves with salt water and fresh water in a typical sand reservoir where the logarithm of counts per ten minutes in each .05 m.e.v. increment is plotted versus energy in million electron volts.

FIGURE 1a shows response curves with salt water and fresh water in a sand reservoir of 27.5 percent porosity and with borehole conditions including a 5.5 inch, 14 pound casing, mud in the annulus and salt water in the casing. The difference between the response of salt water and fresh water is clearly shown between 2.5 m.e.v. and 9.5 m.e.v. However, the critical energy window, i.e., the window most sensitive to the chlorine and least affected by borehole conditions, etc., cannot be determined from this curve since errors introduced by count rate variations, salinity variations, and changing borehole and reservoir conditions are not shown. Applicants have found that these errors and changing conditions prevent the prior art windows from producing satisfactory chlorine logs in all but the most ideal conditions described heretofore.

To accurately portray the effects of these errors and changing conditions and to demonstrate how applicants' window is less affected by same, the graphs to be used hereinafter plot relative sensitivity to chlorine versus energy in million electron volts instead of the logarithm of counts per given time versus million electron volts. By plotting relative sensitivity to chlorine, both the change in count rate and the magnitude of the rate are considered so as to compensate for the effects of statistical variations in count rates that are present. Put in another way, the relative sensitivity is a measure of the percent change in count rate between the response of salt water and fresh water weighted by a factor indicative of the magnitude and the statistical accuracy of the count rate. Therefore, this relationship is the true expression of the difference between fresh water and salt water in the formation. Relative chlorine sensitivity can be expressed by the formula:

$$RS = \frac{Sw - Fw}{Fw}\sqrt{Sw}$$

$Rs$ is relative sensitivity. $Sw$ is the count rate in each energy increment per unit time with salt water as the formation fluid and $Fw$ is the count rate in each energy increment per unit time with fresh water as the formation fluid. In the formula $$\frac{Sw - Fw}{Fw}$$

is an expression to show percent change and $\sqrt{Sw}$ is a conventional expression to compensate for statistical variations in the count rate. See AEC Manuscript (AECU–262) entitled, Statistical Methods Used in the Measurement of Radioactivity, by Alan A. Jarrett, dated June 17, 1946, p. 15.

Figure 1B:
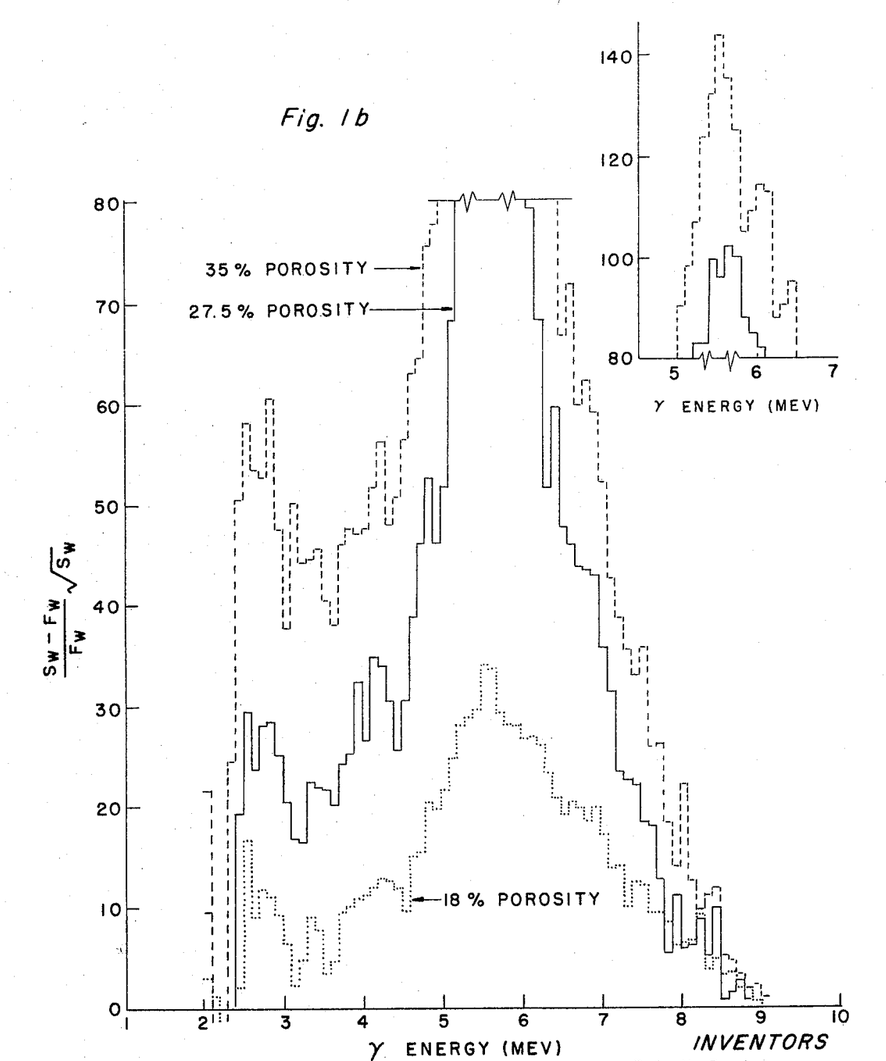
FIGURES 1b–1f show plots of relative chlorine sensitivity versus energy in million electron volts as borehole and formation conditions change.

Let us now consider the relative chlorine sensitivity as defined above when at least one of the reservoir or borehole conditions is varied. FIGURE 1b presents plots of relative chlorine sensisitivity versus energy in million electron volts for a given set of borehole conditions with a given formation fluid salinity content when the formation porosity is varied from 18 to 27.5 to 35 percent. The borehole conditions include 5.5 inch, 14 pound casing with mud in the annulus and salt water in the casing. The curves in FIGURE 1b show that changes of sensitivity with porosity are prevalent throughout the spectrum but that the greatest chlorine sensitivity is found in the neighborhood of 5.5 to 5.7 m.e.v.; however, this very narrow window is not satisfactory since it gives such a low total count rate. Applicants have unexpectedly found that the critical energy range of 5 to 6.5 m.e.v. not only reduces statistical variations; it minimizes the effects produced by changing borehole conditions, and is most sensitive to the presence of chlorine regardless of porosity. The chlorine logs produced by this energy range have been compared with and found superior to logs produced by other prior art devices using the various prior art energy ranges.

The criticality of the 5 to 6.5 m.e.v. portion of the spectrum is demonstrated by the following curves which show relative chlorine sensitivity under various changing conditions normally found in the field. These curves show that there is substantially more sensitivity to chlorine in the 5 to 6.5 m.e.v. energy range than is found above or below this energy range.

Figure 1C:
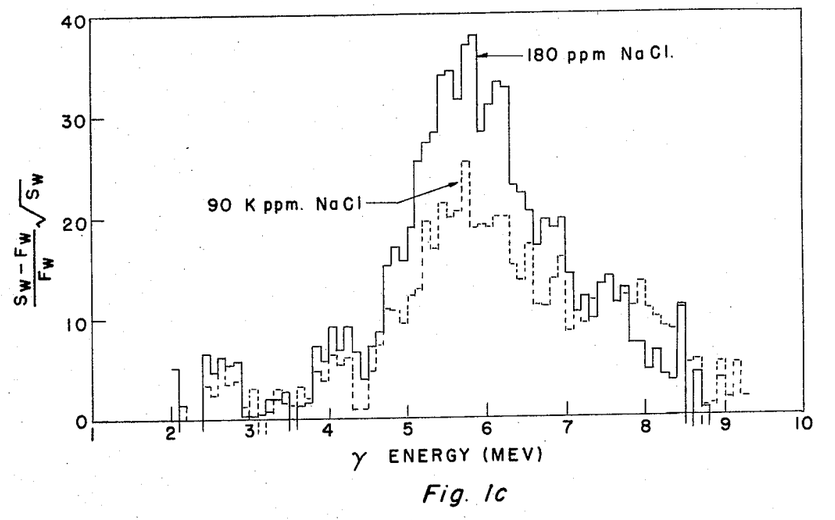

FIGURE 1c presents plots of relative chlorine sensitivity versus energy in million electron volts when the formation fluid salinity is varied from 180,000 to 90,000 p.p.m. with the formation porosity 18 percent and the remaining conditions as described for FIGURE 1b above.

The two curves clearly show that with various salinities the 5 to 6.5 energy range is most sensitive to salt water. A comparison of the two curves shows clearly that changes in formation salinity are most readily detected by the 5 to 6.5 m.e.v. window.

Figure 1D:
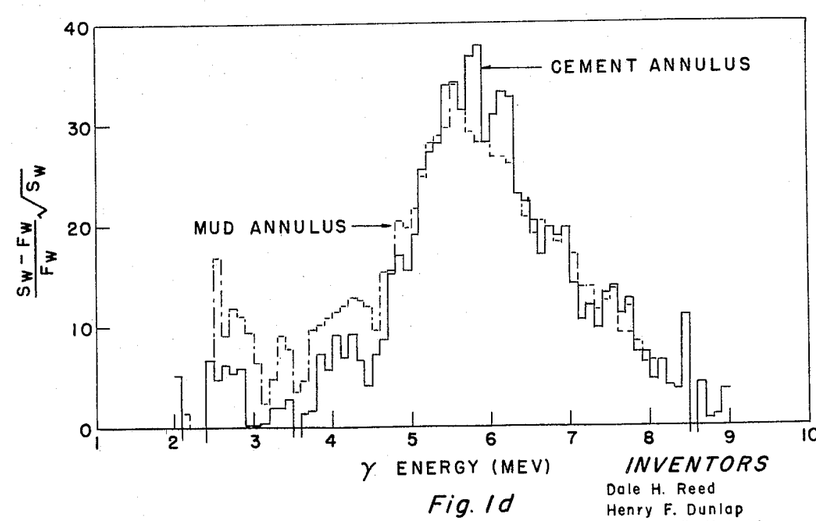

FIGURE 1d presents plots of relative chlorine sensitivity versus energy in million electron volts when the annulus material is changed from cement to mud with the formation porosity 18 percent and the remaining conditions as described for FIGURE 1b. The calcium in the cement accounts for changes in sensitivity; however, it should be noted that sensitivity is roughly the same in the window range from 5 to 6.5 m.e.v.

Figure 1E:
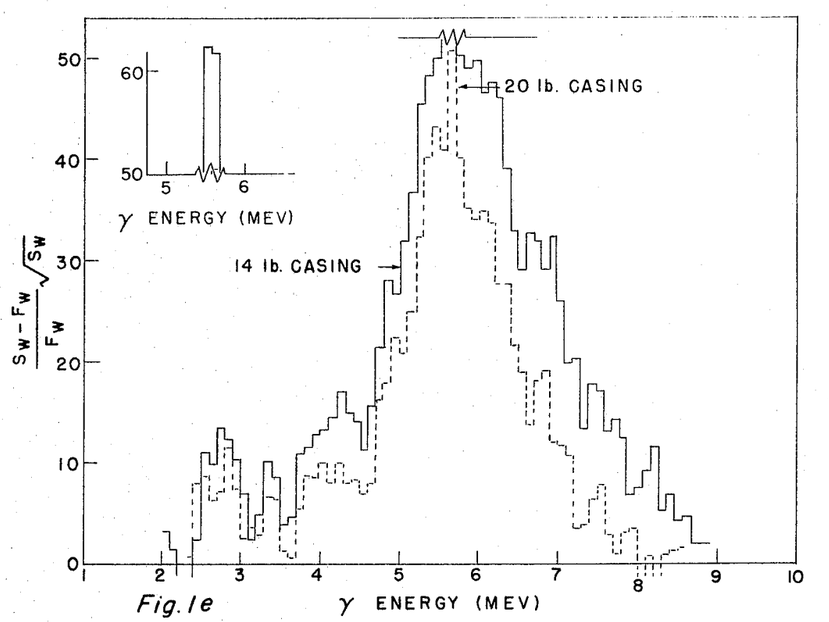

FIGURE 1e presents plots of relative chlorine sensitivity versus energy in million electron volts when the casing changes from 20 pounds to 14 pounds per foot with the formation porosity 18 percent and the other conditions as described for FIGURE 1b. This figure clearly shows that the 5.0 to 6.5 m.e.v. window, in both cases, remains more sensitive to chlorine than the prior art windows. The figure also shows that the chlorine sensitivity is somewhat increased when casing weight is changed from 20 pounds to 14 pounds per foot.

Figure 1F:
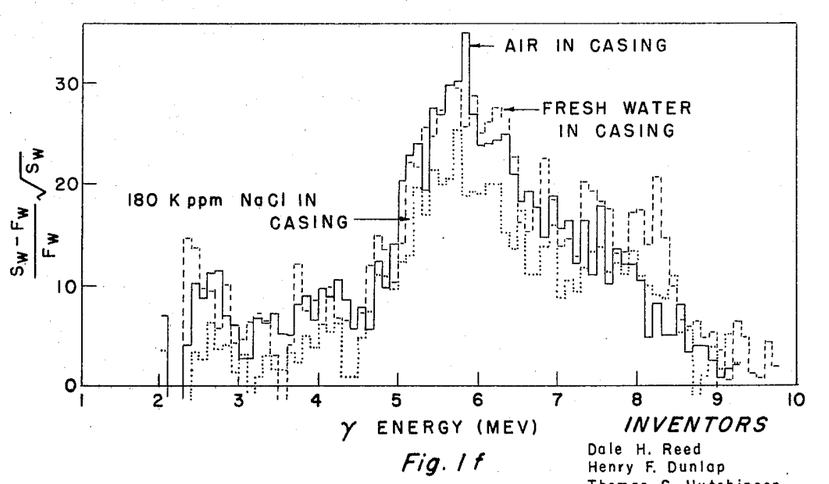

FIGURE 1f shows plots of relative chlorine sensitivity versus energy in million electron volts when the fluid in the casing is changed from salt water to fresh water to air with the formation porosity 18 percent, the formation fluid salinity 90,000 p.p.m., cement in the annulus and the remaining conditions as described in FIGURE 1b. This figure clearly shows that regardless of the fluid in the casing, the sensitivity peak remains in the 5.0 to 6.5 window and not in the prior art windows.

In summary, the information contained in the figures above and found in the numerous experimental runs discussed heretofore clearly supports the criticality of the 5 to 6.5 m.e.v. energy range. While under a specific set of conditions a very narrow energy range may exhibit a higher chlorine sensitivity, its position will vary with conditions and it is always subject to large statistical errors. The critical limits of the 5 to 6.5 m.e.v. range include the highest chlorine sensitivity regardless of the conditions and are wide enough to materially reduce statistical variations.

It has been found that the relative sensitivity to chlorine relationship, discussed in connection with the figures above, can be used in a method of chlorine logging. To be more specific, in a chlorine logging operation where an interval of a logged borehole is selected on the basis that it contains uniform borehole conditions, the method includes the steps of (a) in the selected interval, obtaining the best match of measured data with laboratory determined data to obtain borehole and formation conditions at the selected interval, (b) running a full prompt capture gamma ray spectrum at a zone of interest within the selected interval, and (c) plotting relative chlorine sensitivity using data obtained from steps (a) and (b). Presence of salt water in the zone of interest will cause a characteristic peak in the plotted curve. Deviations from this characteristic peak may be used to detect unexpected formation characteristics in the zone of interest.

Figure 2:
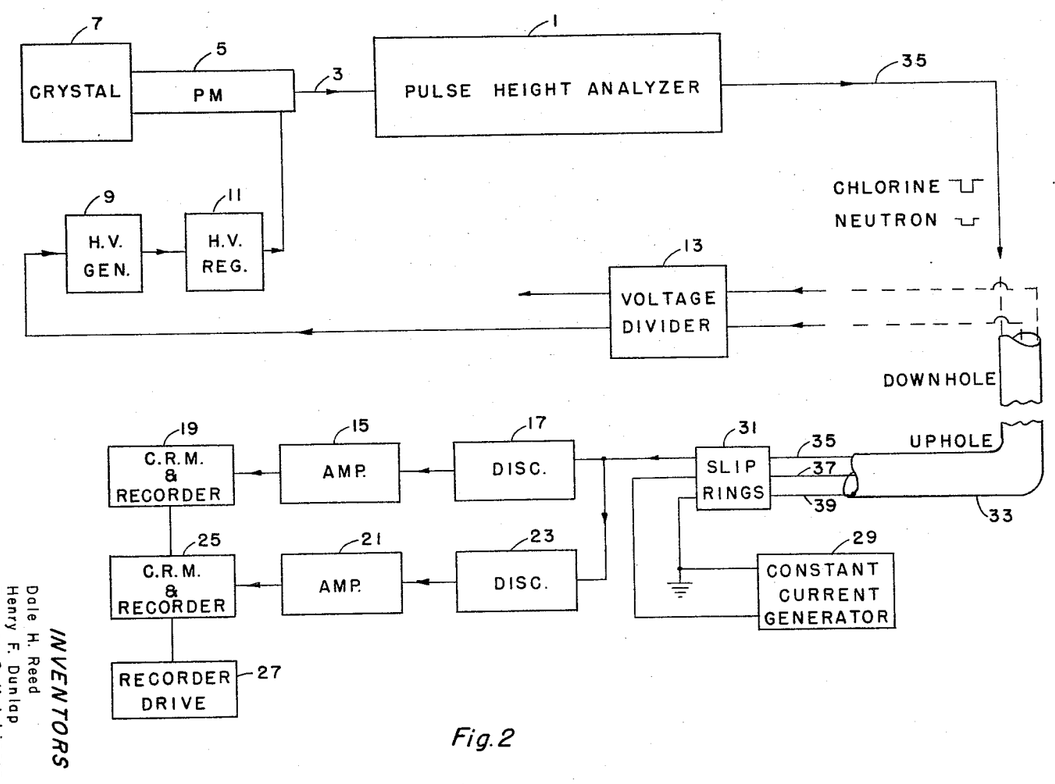
FIGURE 2 shows a block diagram of a logging instrument suitable for carrying out applicants' invention.

Consider now devices for practicing the invention. FIGURE 2 discloses a block diagram of a logging system capable of practicing applicants' improved chlorine logging operation. Although the over-all invention can be practiced with various combinations of conventional components, it is preferable to employ the invention with the component combination shown in FIGURE 2. The downhole components shown in FIGURE 2 include a novel pulse height analyzer circuit 1 electrically connected by representative conductor 3 to a conventional photomultiplier tube 5. Tube 5 views scintillation crystal 7 and is powered by high voltage generator 9 and regulator 11. Voltage divider system 13 is connected to high voltage generator 9 and to other conventional low voltage elements not shown for purposes of simplification. The uphole conventional components of the system include amplifier 15 connected between discriminator 17 and count rate meter and recorder 19 and amplifier 21 connected between discriminator 23 and count rate meter and recorder 25. The recorders are driven by a single recorder drive 27. Contant current generator 29 and discriminators 17 and 23 are shown connected to slip rings 31. Multiconductor cable 33 contains conductor 35 connecting discriminators 17 and 23 to pulse height analyzer 1. Conductors 37 and 39 are connected between generator 29 and voltage divider 13. If desired, conductor 39 can be connected through the shield of cable 33 as shown. Cable 33 may be wound or unwound from a conventional logging drum (not shown) to raise or lower the logging sonde (not shown) containing the downhole components shown in FIGURE 2.

Various significant advantages accrue from using the device shown in FIGURE 2. It has been found that the simultaneous detection of the two portions of the prompt capture gamma ray energy spectrum (chlorine and neutron curves) by a single crystal-photomultiplier tube combination is significantly superior to the detection of these two portions by two separate crystal and photomultiplier tube combinations for the following reasons:

(1) Two crystals will not simultaneously examine the same portions of the subsurface formation since either their respective source-detector spacings are different and they are examining different portions of the subsurface formation or they do not simultaneously examine the same portions of the subsurface formations. Simultaneous examination of the same portions of formations with the same borehole conditions provides the optimum conditions for measurement of formation salinity.

(2) Two crystals will increase statistical variations in the system.

(3) The gains of two photomultiplier tubes will vary differently. This will cause marked differences between the curves and will erroneously indicate significant changes in formation salinity.

(4) A single crystal-photomultiplier combination allows for optimum shielding geometry. With two detectors the space occupied by the second detector is not available for shielding.

(5) The use of a single crystal allows a single first stage amplifier (41, FIGURE 3) to be used. This minimizes the unwanted effects of slight gain in the first stage of amplification.

It has also been found that the use of the novel downhole pulse height analyzer is superior to the uphole analyzing systems. This is true because with uphole discrimination the pulses are more adversely affected by transmission over the logging cable.

Figures 3, 4:
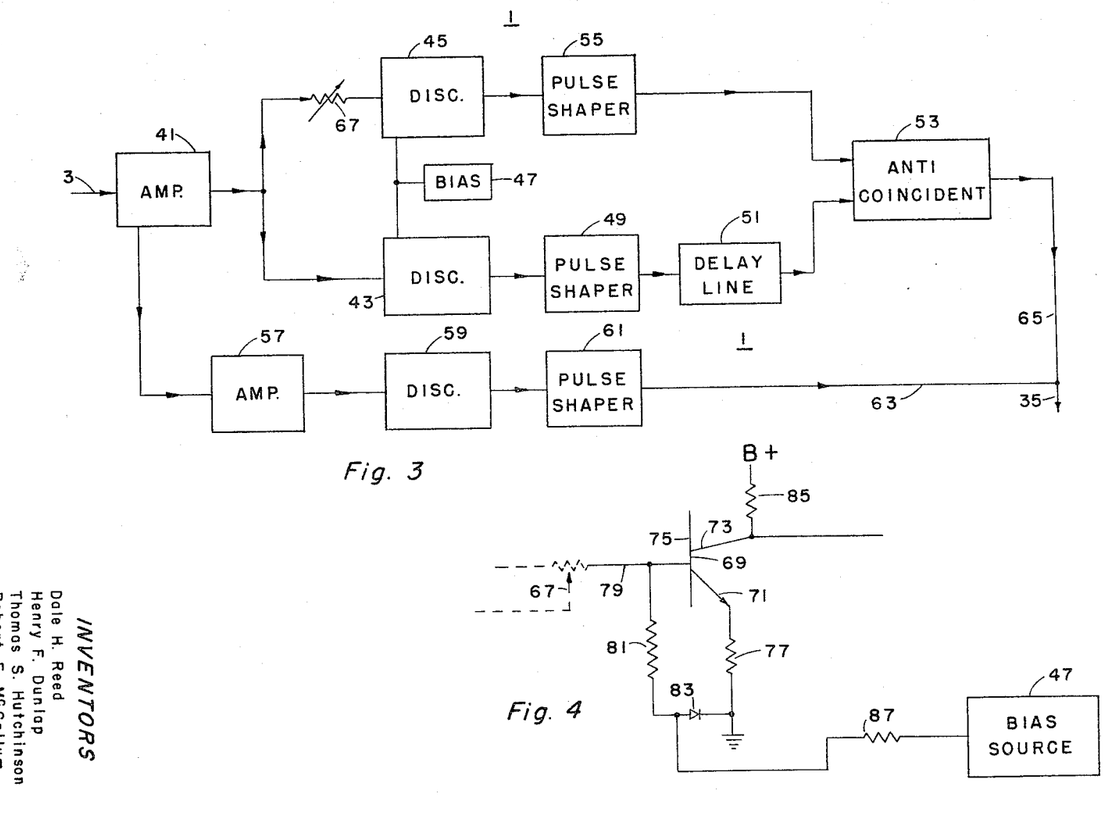
FIGURE 3 shows a block diagram of the novel pulse height analyzer.
FIGURE 4 shows a circuit diagram of the preferred embodiment of the discriminators used in FIGURE 3.

FIGURE 3 shows a block diagram of the novel pulse height analyzer 1 shown in FIGURE 2. Pulse height analyzer 1 includes a high energy gamma (chlorine) signal differential discriminator section and a low energy gamma (neutron) signal discriminator section. The chlorine signal discriminator section includes amplifier 41 connected in parallel to discriminators 43 and 45, bias source 47 connected in parallel to discriminator 43 and discriminator 45, discriminator 43 connected serially to pulse shaper 49, delay line 51 and anticoincident circuit 53 and discriminator 45 serially connected to pulse shaper 55 and anticoincident circuit 53. The neutron signal discriminator section includes amplifier 57 serially connected to discriminator 59 and pulse shaper 61. Output conductor 63 from 61 and output conductor 65 from 53 are connected in parallel to conductor 35 in cable 33. Pulse height analyzer input 3 is shown connected through a portion of block 41 to amplifier 57. However, if desired, input 3 can be connected in parallel to 41 and 57. Since, for purposes to be discussed hereinafter, it is desirable to utilize different amplification factors in amplifiers 41 and 57, the preferred embodiment, FIGURE 5a, connects pulse height analyzer input 3 through amplifier 41's initial emitter follower stage to amplifier 57. Rheostat 67 can be utilized as shown or incorporated in discriminator circuit 45. This rheostat is utilized in conjunction with the gain of amplifier 41 and the design value of bias 47 to determine the upper voltage limit for the chlorine spectrum. The lower threshold voltage is determined by bias 47, the gain of amplifier 41 and bias 47. The lower threshold voltage for the neutron spectrum is determined by a bias source within discriminator circuit 59 and the gain of amplifier 57.

In operation amplifier 41 receives voltage pulses on input 3 from photomultiplier tube 5, FIGURE 2, and passes these pulses representing various prompt capture gamma ray energies to the chlorine signal discriminator circuit and to amplifier 57. As will be explained in detail hereinafter, threshold voltage of discriminator 43 is set to pass pulses representing energies of 5 m.e.v. or more while the threshold voltage of discriminator 45 is set to pass pulses representing energies of 6.5 m.e.v. or more. The threshold voltage of discriminator 59 is set to pass pulses representing energies of 2 m.e.v. or more. If a pulse representative of a 6 m.e.v. prompt capture gamma ray is received by amplifier 41, the pulse is simultaneously applied to discriminators 43, 45 and through amplifier 57 to discriminator 59. Because of the predetermined threshold voltages, discriminators 43 and 59 pass the pulse and discriminator 45 does not pass it. Pulse shaper 49 receives 43's output and amplifies it to a predetermined amplitude after which it is delayed by delay line 51 and applied to the input of anticoincident circuit 53. With only one pulse arriving at 53 the pulse is passed through the anticoincident circuit to output 65 as a negative going pulse of predetermined amplitude. See the chlorine pulse, FIGURE 2. A pulse representing the same gamma ray is simultaneously passed through discriminator 59 and pulse shaper 61 where it is amplified to a predetermined amplitude (one-half the amplitude of the pulse from 53). See neutron pulse, FIGURE 2. These two pulses of different amplitudes but representing the same energy are combined and set uphole on conductor 35. Uphole, the combined, large amplitude pulse is passed by discriminators 17 and 23, FIGURE 2, and recorded as part of the chlorine curve by recorder 19 and as part of the neutron curve by recorder 25. Discriminator 17 is biased to pass only large amplitude pulses while discriminator 23 is biased to accept the small amplitude pulses from 61, FIGURE 3, and the large amplitude pulses from 53.

If amplifier 41 receives a pulse representing slightly more than 6.5 m.e.v., the pulse is passed by all of the downhole discriminators. The pulse passed by discriminator 45 is amplified to a predetermined amplitude and width by 55 and applied to the input of anticoincident circuit 53. The pulse passed through discriminator 43 is amplified to about the same predetermined amplitude but of opposite polarity and delayed by 51 so that it arrives at the input of 53 slightly after the leading edge of the pulse from 55. Since both pulses arrive at 53 at approximately the same time, no output is produced on conductor 65; however, a small amplitude pulse does appear on conductor 63 and is sent uphole on conductor 35. This pulse is produced by the original pulse passing through amplifier 57, discriminator 59 and pulse shaper 61. Since this is a small amplitude pulse, it is rejected by discriminator 17, FIGURE 2, but passed by discriminator 23 and recorded as part of the neutron curve by recorder 25. From the above, it is clear that pulses representing energy between 5.0 m.e.v. and 6.5 m.e.v. appear on conductor 65 as a negative going pulse of a predetermined amplitude and pulses representative of 2.0 m.e.v. and above appear on conductor 63 as negative going pulses one-half the amplitude of the first pulse. If both pulses appear they are combined on conductor 35 as a single large amplitude pulse.

It should be understood that the novel pulse height analyzer can be instrumented by vacuum tubes or by transistors. Since the pulse height analyzer is utilized downhole, the preferred embodiment shown in FIGURE 5 utilizes transistors to make the circuit more shock-resistant and to reduce power consumption and space requirements. Since these features are not of great importance in the uphole circuit, either tubes or transistors can be used.

FIGURE 4 discloses the preferred embodiment of the novel discriminators utilized in pulse height analyzer 1, FIGURE 3. The discriminator includes transistor 69 with emitter 71, collector 73 and base 75. Emitter resistor 77 is connected between 71 and ground. Input conductor 79 is connected in parallel to base 75 and isolation resistor 81 which in turn is connected in series with Zener diode 83 to ground. Load resistor 85 is connected between B+ and 73. Bias voltage source 47 is connected through ballast resistor 87 to the anode of Zener diode 83.

By using the discriminators as arranged in FIGURE 3, the pulse height analyzer is able to operate directly on the photomultiplier output pulses without the requirement for stable high gain amplification. Since the photomultiplier tube's output voltages range from less than one volt to approximately four volts, most conventional discriminators used with the tube require stable high gain amplification and those that do not require such preamplification are much more complex than the discriminators shown. By using a back biased transistor-type amplifier stage with negative feedback, FIGURE 4, as a discriminator, low level discrimination is practiced and sufficient voltage gain is produced within the stage to maintain stable thresholds throughout the pulse height analyzer. Being more specific, the pulse shaping circuits 49, 55 and 61 following their respective discriminator circuits in FIGURE 3 commonly have a 0.1 volt variation in trigger level as a result of temperature changes that occur during downhole operations. Therefore, if only a 0.01 volt variation is allowed in the discriminator levels, it is necessary to amplify their input signals by a factor of 10 to insure that the allowable small signal variations passed by the discriminators have sufficient amplitude to overcome threshold variations encountered in the remaining portions of the pulse height analyzer that are sensitive to temperature variations. The improved and simplified discriminator shown in FIGURE 4 develops this necessary gain within the discriminator stage instead of resorting to the conventional solution of making a preceding amplifier (41 or 57, FIGURE 3) a complicated circuit designed to produce the necessary stable high gain amplification.

In operation, transistor 69 is normally biased to cut off by an accurate stable voltage developed by source 47. In the preferred embodiment, 47 is a constant current generator 29 and voltage divider 13, FIGURE 2, adapted to produce a negative 15 volts which is applied across ballast resistor 87 to the anode of Zener diode 83. With the preferred parameter values shown in FIGURE 5a, a bias of approximately −6 volts is applied to transistor base 75. This bias voltage which can be varied as desired is the effective threshold voltage of the discriminator. As will be detailed in the calibration steps discussed hereinafter, preceding amplifier stage 41 or 57, FIGURE 3, is varied until its amplification factor causes the minimum desired voltage pulse to overcome this threshold voltage. Assuming that a 1.92 volt pulse represents a 5 m.e.v. capture gamma ray, the amplification factor of 41 is varied until this pulse overcomes the −6 volt bias applied to base 75, FIGURE 4, and the portion exceeding 6 volts is passed. More specifically, let us assume that in the preferred embodiment the necessary amplification factor of 41 is approximately 3. This means that the 5 m.e.v. energy represented as a voltage pulse of 1.92 must be amplified to a voltage of approximately 6.01 volts before it is passed through the discriminator. The pulse shaping circuit, such as 55, FIGURE 3, exhibits a .15 volt threshold voltage which is subject to .1 volt variation due to temperature changes. Therefore to insure that the minimum (.01 volt) signals passed by the discriminator always trigger the pulse shaping circuit, it is necessary for the discriminator to amplify input signals by at least a factor of 10. This necessary amplification is developed according to the size of emitter resistor 77.

Figure 5A:
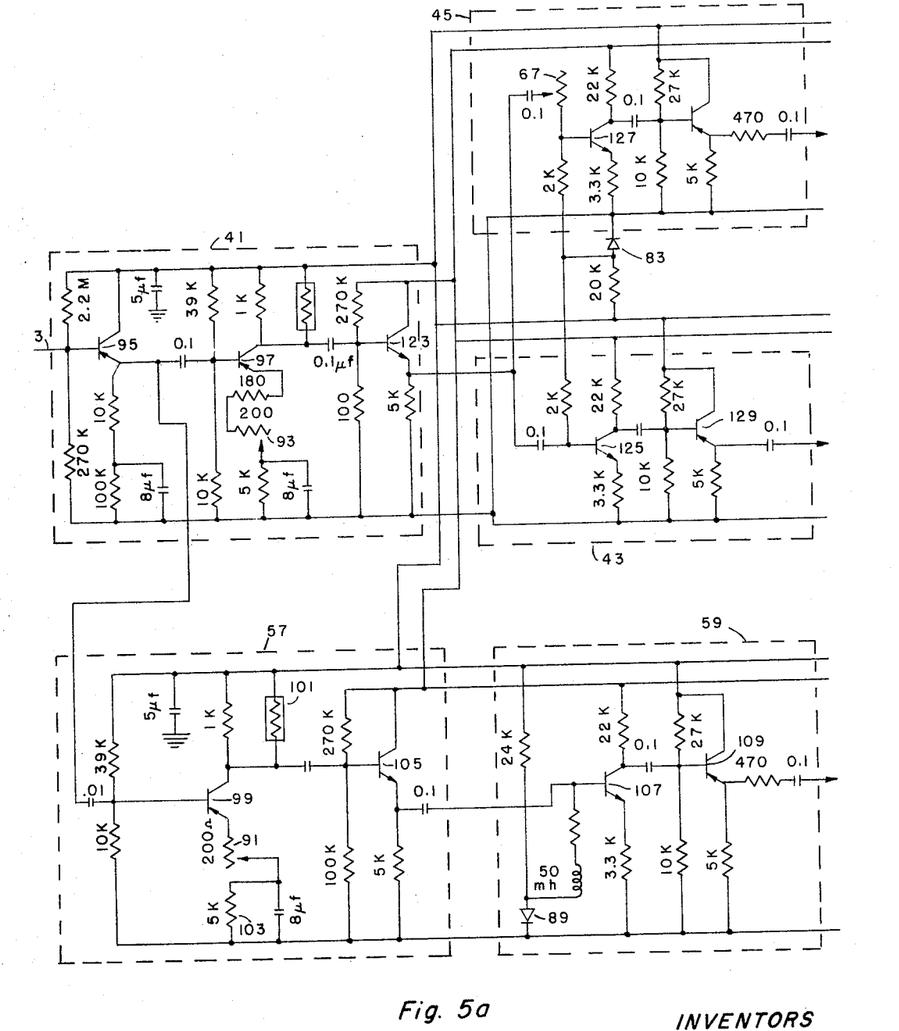
FIGURES 5a and 5b show the preferred embodiment of FIGURE 3.

If it is desirable to establish an upper voltage limit on the discriminator as in 45, FIGURE 5, an attenuating component such as variable resistor 67 shown in FIGURE 4 with dotted lines can be utilized. In the preferred embodiment shown in FIGURE 5a, variable resistor 67 is set to attenuate all undesired voltages so that only voltages above a predetermined level exceed the bias and are passed by the discriminator. If it is desirable to make the discriminator part of a circuit, such as shown in FIGURE 3, but capable of viewing various predetermined windows, the bias applied to the base of the discriminator can be varied to the desired predetermined voltage. For instance, bias source 47, FIGURE 3, can be made to vary to the desired predetermined voltages. If it is undesirable to vary the voltage source a switch and a bank of parallel, different sized Zener diodes can be utilized. One example of the latter embodiment includes a rotary switch which selectively connects a Zener diode of a size to produce the necessary bias voltage on transistor base 75, FIGURE 4.

Figure 5B:
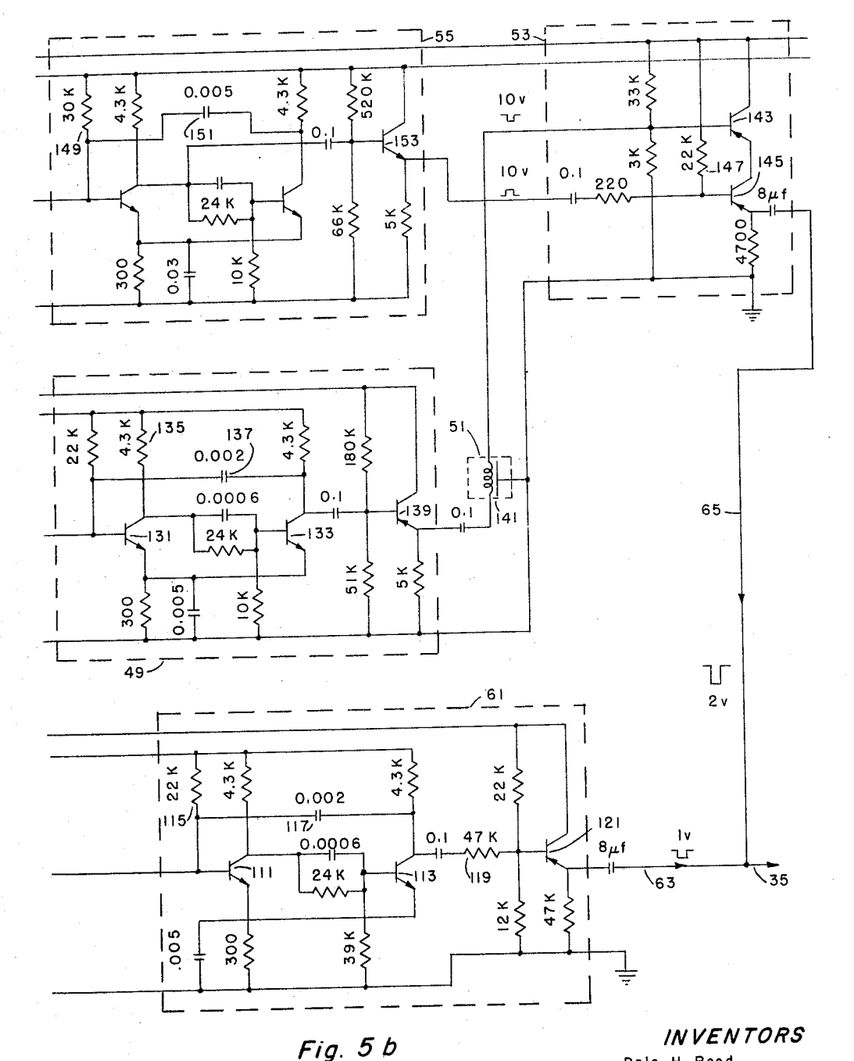

For a detailed discussion of the preferred embodiment of pulse height analyzer 1, FIGURE 3, using discriminators as shown in FIGURE 4, refer now to FIGURES 5a and 5b. FIGURES 5a and 5b show FIGURE 3 components in detail. Note that most of these components are coupled by conventional emitter follower stages for the usual impedance matching and isolation purposes. These emitter follower stages are included with their respective components in dashed blocks numbered to correspond with similar components in FIGURE 3. The FIGURES 5a and 5b embodiment of the pulse height analyzer passes the desired prompt capture gamma ray spectrum by using Zener diode 83 to develop the desired bias or lower threshold voltage for discriminator 43 and the upper voltage level for discriminator 45. Rheostat 67 is used to set the upper voltage level for discriminator 45 above 43. Zener diode 89 is used to develop the lower threshold level for discriminator 59. With this basic disclosure, it is believed that an understanding of the detailed description and operation of the embodiment can be facilitated by first describing the improved calibration procedure.

The improved calibration method provides for the establishment of a test environment which can be accurately and speedily reproduced whenever and wherever the equipment is to be calibrated. Heretofore logging systems have been calibrated by placing their source and detector in a portable test jacket or barrel to produce the test environment. This is unsatisfactory since external influences such as the earth, the logging truck, etc., prevent developing a reproducible number of gamma rays and a reproducible energy spectrum which is necessary in a calibrating operation. In the improved method the test environment is established by placing adjacent the crystal a test source of known strength with a gamma ray energy spectrum which changes rapidly with gamma ray energy level in a predetermined energy range. It is necessary to use a test source with a gamma ray emission spectrum which changes rapidly with energy in a predetermined energy range in order to make precise, unambiguous window settings on the pulse height analyzer. That is, when the test source provides a large change in count rate with a small change in window position and/or width, the windows on the pulse height analyzer can be calibrated with great accuracy. A radium button of a few microcuries strength to establish a 2 m.e.v. threshold is suitable as such a test source. Other test sources such as a thorium button of a few microcuries strength to establish a threshold of approximately 2.6 m.e.v. can be used. In any event, the test source must always be placed in the exact same physical position on the detector, with the same side of the test source toward the detector each time the system is calibrated. The test source can be placed directly on the crystal or can be placed on the outside portion of the sonde overlying the crystal (if the crystal and photomultiplier tube are positioned in the sonde). However, with either test source position it is essential to establish the exact test source position relative to the crystal detector by suitable markings on the crystal or the sonde so that the same physical relationship can be established each time the particular calibration is made. This insures that the same calibration environment is developed each time a particular type of calibration is made. It should be noted that when the test source is placed on the sonde all components between the sonde and the crystal must be marked so that they can also be made to assume the same repeatable physical relationships to the source and the crystal. In addition, it should be noted that a stronger test source is used when it is placed on the sonde. Normally, approximately 20 microcuries is required on the sonde.

Let us now briefly consider the improved calibration method in its entirety. Preliminary preparations must be made before field calibrations can be run. That is, the crystal and the test source must be calibrated in the laboratory to provide a basis for field calibrations. The radium button or other test source to be used is set in a precise, easily repeated position on the crystal, or the sonde, and this position is accurately marked on the crystal, or the sonde. Next the exact count rate per minute above the desired energy threshold produced by this precise test source-crystal arrangement is accurately determined using a precise, laboratory, multi-channel pulse height analyzer such as a ND 120 made by Nuclear Data Co. of Madison, Wisconsin. Of course, the analyzer is previously conventionally calibrated using several gamma ray sources of different, known energies. For purposes of illustration assume that the count rate is determined to be $y$ c.p.m.

The next step, which is the first calibration step normally conducted in field operations, is to adjust the logging tool pulse height analyzer so that it passes pulses representing the energy ranges desired to be logged. This can be done by connecting a variable pulse source such as pulse generator 155, FIGURE 6a, through an accurate potentiometer calibration network 157 to input 3 of pulse height analyzer 1. The calibration network taps, $3.25x$, $2.5x$ and $x$, insure that accurate, desired relationships are established between the generator pulses used to calibrate the pulse height analyzer. Of course, other suitable relationships can be developed depending on the particular pulse height analyzer and the purpose for which it is to be used. The way the discriminators in the particular pulse height analyzer are adjusted will depend upon the type of pulse height analyzer used. With regard to the pulse height analyzer illustrated in FIGURES 5a and 5b, only the gain of amplifiers 41 and 57 need be checked for lower level neutron discrimination and lower level chlorine discrimination and only variable resistor 67 need be checked for upper level chlorine discrimination. This is true since the predetermined bias voltages developed by Zener diode 89 in neutron discriminator 59 and by Zener diode 83 connected to chlorine discriminator 45 are accurate and stable.

Figure 6A:
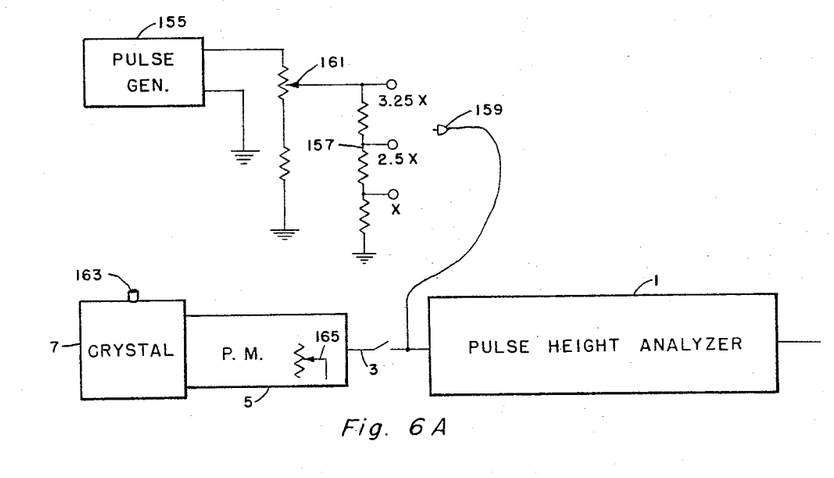
FIGURES 6a and 6b show calibration operations.

Looking at the adjustment of the pulse height analyzer with 155 and 157, FIGURE 6a, in more detail, the pulse amplitude developed at tap $3.25x$ of calibration network 157 is set to approximately 2.5 volts using the coarse amplitude adjustment which is part of conventional pulse generator 155. This 2.5 volt pulse amplitude has been determined to be a suitable level for the illustrated pulse height analyzer; however, this level may vary according to the particular type of pulse height analyzer used. In any event, it is not necessary for the pulse amplitude at the tap to be precisely determined. The pulse height analyzer is then connected through plug 159 to tap $x$ of network 157. Variable resistor 91 in amplifier 57, FIGURE 5a, is adjusted until the pulses of amplitude $x$ (approximately 0.77 volt) are just capable of passing through neutron discriminator 59 with sufficient amplitude to trigger pulse shaper 61. That is, the amplifier gain of 57 is adjusted until counting starts on recorder 25, FIGURE 2. It should be noted at this time that the fine amplitude adjustment 161 is always set to a precise, reproducible reference position. It is now moved slightly to increase the pulse amplitude very slightly. All of the pulses should now pass through the neutron discriminator and further increases in pulse amplitude should have no effect. The fine amplitude adjustment is then moved slightly beyond the reference position producing pulses very slightly reduced in amplitude. The neutron discriminator is now properly adjusted if it does not pass these pulses.

Fine amplitude adjustment 161 is returned to its reference position and plug 159 is moved to tap $2.5x$. Variable resistor 93 in amplifier 41, FIGURE 5a, is adjusted until the pulses of amplitude $2.5x$ (approximately 1.92 volts) from 157 are just capable of passing through lower chlorine discriminator 43, triggering pulse shaper 49 and being counted on recorder 19, FIGURE 2. Fine gain adjustment 161, FIGURE 6a, is again used to insure that the discrimination is very sharp. This is done in the same manner as described above. After this is accomplished, the threshold for the chlorine window is properly adjusted.

With the fine amplitude adjustment 161 in the reference position and 159 in tap $3.25x$, pulses will be passing through discriminator 43 and pulse shaper 49 and up to anticoincident circuit 53. Next variable resistor 67 in amplifier 45, FIGURE 5a, is adjusted until pulses from tap $3.25x$ (approximately 2.5 volts) are just capable of passing through upper chlorine discriminator 45, triggering pulse shaper 55, actuating the anticoincident circuit 53, and therefore preventing the pulses from pulse shaper 49 being counted on recorder 19, FIGURE 2. Now when fine amplitude adjustment 161 is used to slightly increase the pulse amplitude, all of the pulses should pass through upper chlorine discriminator 45 as well as through lower chlorine discriminator 43 and anticoincident circuit 53, FIGURE 2, will completely eliminate counting on recorder 19, FIGURE 2. Fine gain adjustment 161 is moved just beyond its reference position to produce pulses slightly decreased in amplitude. At this setting, the pulses should not pass through 45, FIGURE 5a, but all should still pass through 43. Therefore, all of the pulses are counted by recorder 19, FIGURE 2. Further moderate decreases in pulse amplitude should not change the chlorine response recorded by 19. Now the upper discrimination of the chlorine window is properly set. Before proceeding, however, it is desirable to recheck all three discriminators to see that the adjustment of one has not adversely affected the adjustments of the others. This recheck can be done by repeating the steps described above.

Next, the gain of the photomultiplier circuit 5, FIGURE 6a, must be adjusted so that a 2 m.e.v. gamma ray detected at its photo peak by the crystal will yield a pulse height of precisely $x$ volts (approximately 0.77 volt). It has been found that approximately 0.385 volt per m.e.v. is a satisfactory photomultiplier output voltage-m.e.v. relationship for the illustrated pulse height analyzer. The photomultiplier adjustment is made by adjusting the gain of the photomultiplier circuit until the neutron curve count rate, recorder 25, FIGURE 2, registers $y$ counts per minute with the radium test source 163, FIGURE 6a, at its precise physical location relative to detector crystal 7 as described heretofore. The photomultiplier gain can be varied by adjusting the anode resistor, schematically represented as 165. If the neutron count rate is within a few percent of y, then the neutron curve threshold energy is accurately set at 2 m.e.v. and the chlorine energy window is accurately set to the 5–6.5 m.e.v. window.

Figure 6B:
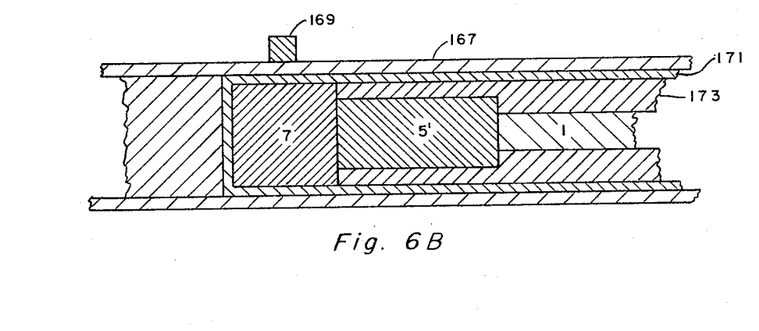

After the detector and the pulse height analyzer have been calibrated as defined above, they are placed in a logging sonde housing 167, FIGURE 6b. Although it is not mandatory, it is highly desirable to repeat the calibration method described above with the components in the sonde housing. Normally no adjustment would be required. FIGURE 6b shows test source 169 positioned at its appropriately marked test position on sonde housing 167. As discussed heretofore, it is extremely important in creating the test environment to place the test source in its properly marked position, and to utilize other suitable markings or means to insure that crystal 7 is always placed in an exact repeatably physical relationship with the test source on the sonde. It is also essential to insure that the intervening components such as vacuum bottle 171, cooling jacket 173 and photomultiplier tube 5' which is normally accompanied by a housing means and magnetic shield, all represented as 5', are made to assume the same repeatable geometry. That is, these elements should be positioned in a manner so that the center of crystal 7 is always in line with and in the same physical relationship with the center of the test source, and that the exact same portions of the intervening components are in line with these centers.

If only one calibration is to be made, it is preferable to calibrate after the components are in the sonde housing since this insures that the tool is calibrated when completely assembled and ready to go in the hole.

For the purpose of illustrating the detailed operation of the embodiment in FIGURES 5a and 5b, let us assume that calibration is complete and that during logging operations the photomultiplier tube develops a negative going pulse of approximately 2.31 volts on conductor 3 from a prompt capture gamma ray energy of approximately 6 m.e.v. This negative going pulse is passed through emitter follower transistor 95 in amplifier circuit 41 and is then applied simultaneously to the base of transistor 97 in amplifier circuit 41 and to the base of transistor 99 in amplifier circuit 57. Amplification in circuit 57 is temperature compensated by thermistor 101 and stabilized by negative feedback provided by emitter resistors 91 and 103. Although the gain of transistor amplifier 99 is approximately 8, the magnitude of the negative going 2.31 volt pulse causes 99 to conduct to saturation producing a positive going pulse of only 9 volts which is sent through emitter follower transistor 105 and onto the base of transistor 107 in discriminator circuit 59. Transistor 107 is biased to approximately —6 volts by a Zener diode 89 and the positive 9 volt pulse causes 107 to conduct developing a negative going pulse through emitter follower transistor 109. This negative going pulse is in excess of the approximately .15 threshold voltage necessary to trigger pulse shaping circuit 61. Circuit 61 is a unistable multivibrator made up of transistors 111 and 113 and their associated circuitry as shown. The negative pulse from 59 is applied to the base of transistor 111 cutting off 111 and turning on transistor 113. The negative going pulse produced from 113 is approximately 10 volts in amplitude and approximately 20 microseconds in width. The width of the pulse is determined by the value of resistor 115 and capacitor 117 in the multivibrator circuit.

It should be noted that after each pulse shaping stage in FIGURE 5b, the amplitudes of the pulses produced are no longer related to the gamma ray energies that originally produced the pulses. For instance, in the neutron circuit, all pulses produced by gamma ray energy of 2 m.e.v. or more will leave circuit 61 as negative going pulses of equal amplitude and width. Of course, the polarity size and width are dependent on the circuit used. After leaving the pulse shaping circuit, the negative going 10 volt pulse produced by the preferred embodiment is attenuated to approximately one volt by resistor 119 and applied to the base of power amplifier transistor 121 after which it is sent through 63 to conductor 35.

The original negative going 2.31 volt pulse which was applied to the base of transistor 97 simultaneously with the pulse applied to transistor 99 will now be considered. Amplifier circuit 41 amplifies the pulse by a factor of approximately 3 thereby producing a positive going pulse of approximately 6.9 volts. Like transistor 99 in circuit 57, transistor 97 is stabilized by heavy emitter negative feedback action and thermistor temperature stabilization.

The positive going pulse from 97 is passed through emitter follower transistor 123 and simultaneously applied to the base of transistors 125 and 127 in discriminator circuits 43 and 45, respectively. However, the portion of the 6.9 volt pulse applied to transistor 127 is attenuated to less than 6 volts by variable resistor 67 at the base of transistor 127. Because of this attenuation the pulse does not pass through discriminator 45 since it does not exceed the 6 volt threshold bias applied to transistor 127 by Zener diode 83. The unattenuated approximately 6.9 volt pulse which is also applied to transistor 125 in discriminator 43 exceeds the 6 volt bias applied to transistor 125 by Zener diode 83. Therefore, transistor 125 conducts passing a positive going pulse through emitter follower transistor 129. This pulse exceeds the approximately .15 volt threshold voltage of pulse shaper circuit 49 causing transistor 131 to turn off and 133 to conduct. The negative pulse produced from this multivibrator action produces a negative going pulse of approximately 10 volts and a predetermined width set by the values of resistor 135 and capacitor 137. In this particular instrumentation, the width is equal to approximately 20 microseconds. The negative going pulse is passed through emitter follower transistor 139 and one microsecond delay line 141 to the base of transistor 143 in anticoincident circuit 53. Transistors 143 and 145 are in series. Transistor 145 is normally biased to conduction by resistor 147. Therefore, the negative going 10 volt signal applied to the base of 143 produces a negative going 2 volt output on conductor 65. The signal is reduced to 2 volts by the line driving power capabilities of the anticoincident circuit 53.

If a pulse representing a gamma ray of capture energy of 6.5+ is received at amplifier circuit 41 instead of the pulse representing 6 m.e.v. as described above, the pulse energy passes through discriminator circuits 43 and 59 as described and also through discriminator circuit 45. Pulse shaping circuit 55 operating generally as circuit 49 produces a positive going pulse approximately 10 volts in amplitude but approximately 25 microseconds in width due to the value of resistor 149 and capacitor 151. After passing through emitter follower transistor 153 the positive pulse is applied to the base of transistor 145. This pulse turns off 145 thereby preventing the passage of the later arriving negative pulse from delay line 141. In view of the cut-off action imposed by discriminator circuit 55 and since pulses representing energy less than 5 m.e.v. will not overcome the threshold bias of either 43 or 45, it is clear that only energy within the 5 to 6.5 m.e.v. range can be passed to output 65 as a 2 volt negative going pulse. Of course, by varying 91, 93 and 67, the range can be varied as desired. The threshold voltage on transistor 107 allows all pulses representing energy of 2 m.e.v. or over to pass to line 63 as a one volt negative pulse from transistor 121.

If a 2 volt negative going pulse from line 65 is produced along with a one volt negative going pulse from line 63, the impedance matching characteristics of conductor 35 system are such that larger 2 volt pulse will always dominate the smaller pulse allowing only the larger pulse to travel uphole.

Although only the preferred embodiments have been described in detail, numerous other modifications can be

We claim:
1. A method for calibrating a radioactive logging system including a detector of gamma ray energy and means for rejecting gamma rays whose energies vary from at least one predetermined energy range, comprising
   (a) connecting a pulse generator to said means for rejecting gamma rays,
   (b) feeding electrical pulses of predetermined voltage proportional to a predetermined energy level defining said predetermined energy range to said means for rejecting gamma rays, and
   (c) adjusting the output of said means for rejecting gamma rays until said output is indicative of rejection of all energies varying from said predetermined energy range.
2. A method in accordance with claim 1 wherein the rejected gamma rays are gamma rays whose energies are below the one predetermined energy range.
3. A method in accordance with claim 1 wherein the rejected gamma rays are gamma rays whose energies are above and below the one predetermined energy range.
4. A method in accordance with claim 1 wherein the rejected gamma rays are gamma rays whose energies are above and below the one predetermined energy range and below a second predetermined energy range.
5. A method for calibrating a radioactive logging sonde, including a detector having a crystal capable of scintillating in response to gamma rays and a photomultiplier capable of converting said scintillations to electrical pulses and means for rejecting gamma rays whose energies vary from a predetermined energy range comprising
   (a) connecting a pulse generator to said means for rejecting gamma rays,
   (b) feeding electrical pulses of predetermined voltage proportional to a first predetermined energy level to said means of rejecting gamma rays,
   (c) adjusting the output of said means for rejecting gamma rays until said output is indicative of rejection of all pulses representing gamma rays with energies below said predetermined energy level,
   (d) placing a source of gamma ray energy of known strength whose count rate rapidly changes at a predetermined energy level adjacent said crystal, and
   (e) adjusting the photomultiplier output until a predetermined count rate is obtained.
6. A method in accordance with claim 5 wherein
   step (b) is modified whereby electrical pulses of predetermined voltages proportional to first, second, and third predetermined energy levels are fed to the means for rejecting gamma rays,
   step (c) is modified whereby the outputs of said means for rejecting gamma rays are adjusted until a first output is indicative of rejection of all pulses representing gamma rays with energies below the first predetermined energy level and a second output is indicative of acceptance of all pulses representing gamma rays with energies above said second predetermined energy level and below said third predetermined energy level, and
   step (e) is modified whereby the photomultiplier output is adjusted until a predetermined count rate is obtained on said first output.

References Cited by the Examiner

UNITED STATES PATENTS

| | | | |
|---|---|---|---|
| 2,905,826 | 9/1959 | Bonner et al. | 250—83.6 |
| 2,956,165 | 10/1960 | Johnson | 250—71.5 X |
| 3,072,790 | 1/1963 | Hopkinson et al. | 250—83.6 X |
| 3,090,867 | 5/1963 | Swanson et al. | 250—83.6 X |
| 3,108,188 | 10/1963 | Dewan et al. | 250—83.6 X |

RALPH G. NILSON, *Primary Examiner.*

ARCHIE R. BORCHELT, *Examiner.*